United States Patent
Kim

(10) Patent No.: US 7,677,122 B2
(45) Date of Patent: Mar. 16, 2010

(54) STEERING ANGLE SENSOR ASSEMBLY FOR VEHICLE

(75) Inventor: Ji Woong Kim, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 334 days.

(21) Appl. No.: 11/669,201

(22) Filed: Jan. 31, 2007

(65) Prior Publication Data

US 2008/0127755 A1    Jun. 5, 2008

(30) Foreign Application Priority Data

Dec. 1, 2006    (KR) .................... 10-2006-0120618

(51) Int. Cl.
*G01N 19/00* (2006.01)
(52) U.S. Cl. .................................. 73/865.9
(58) Field of Classification Search ............. 73/865.9, 73/162
See application file for complete search history.

(56) References Cited

U.S. PATENT DOCUMENTS

| | | | | |
|---|---|---|---|---|
| 3,739,647 | A | * | 6/1973 | Crooks ................. 74/15.63 |
| 4,342,806 | A | * | 8/1982 | Kutsch .................. 428/174 |
| 4,681,182 | A | * | 7/1987 | Suzuki et al. ............ 180/444 |
| 5,473,483 | A | * | 12/1995 | Choi .................. 360/96.51 |
| 5,576,784 | A | * | 11/1996 | Tsunefuji et al. .......... 396/418 |
| 5,646,523 | A | | 7/1997 | Kaiser et al. |
| 6,862,551 | B1 | | 3/2005 | Kang et al. |
| 6,864,681 | B1 | * | 3/2005 | Horner et al. .......... 324/207.25 |
| 6,909,282 | B2 | * | 6/2005 | Onishi et al. .......... 324/207.25 |
| 6,931,312 | B2 | | 8/2005 | Shin |
| 6,941,241 | B2 | | 9/2005 | Lee et al. |
| 7,050,895 | B2 | | 5/2006 | Lee et al. |
| 2005/0171727 | A1 | | 8/2005 | Sakabe et al. |

FOREIGN PATENT DOCUMENTS

JP    2005-249769    9/2005

OTHER PUBLICATIONS

English language abstract of JP 2005-249769.

* cited by examiner

*Primary Examiner*—Hezron Williams
*Assistant Examiner*—Alex DeVito
(74) *Attorney, Agent, or Firm*—Greenblum & Bernstein P.L.C.

(57) ABSTRACT

In a steering angle sensor assembly for a vehicle, dependent gears are provided to mesh with an inner periphery of a rotary member rotated together with a steering wheel and to be rotated, and a circuit board that detects the rotation of the dependent gears and generates electric signals is also provided on the side of the dependent gears provided on the inner periphery of the rotary member. Accordingly, the entire size of the steering angle sensor assembly can be reduced to be substantially the same as the size of the rotary member rotated together with the steering wheel. As a result, it is possible to further reduce the entire size of the steering angle sensor assembly.

10 Claims, 3 Drawing Sheets

STEERING ANGLE SENSOR ASSEMBLY FOR VEHICLE

CROSS-REFERENCE TO RELATED APPLICATIONS

The present application is based on, and claims priority from, Korean Application Serial Number 10-2006-0120618, filed on Dec. 1, 2006, the disclosure of which is hereby incorporated by reference herein in its entirety.

FIELD OF THE INVENTION

The present invention relates to a steering angle sensor for a vehicle, and more particularly to a steering angle sensor assembly that includes an inscribed gear train for detecting a steering angle to reduce the entire size thereof.

BACKGROUND OF THE INVENTION

According to a general steering system for changing a traveling direction of a vehicle, a steering column is connected to a steering wheel provided in front of a driver's seat, and the steering column for transmitting the operation of the steering wheel operates a rack gear mechanism to change the traveling direction of a vehicle.

In general, the steering system obtains information on a rotation angle or angular velocity of the steering wheel based on the linear motion of the traveling vehicle, and uses the information in an ECU to perform a roll control or a turning control. For this reason, a steering angle sensor for measuring the steering angle of the steering wheel is provided between the steering wheel and the steering column.

The steering angle sensor is rotated to correspond to the rotation of the steering wheel, and calculates an actual steering angle of the steering wheel. For example, the steering angle sensor is provided between the steering wheel and the steering column, and includes a housing that is connected to an electric connector so as to transmit signals to an ECU. A gear train, which is rotated by the rotation of the steering wheel and detects a rotation angle of the steering wheel, is provided in the housing. The steering angle sensor includes a PCB including a circuit that detects the rotation angle of the gear train, converts the rotation angle into electric signals, and transmits the signals to an ECU.

If the steering angle sensor accurately detects a steering angle and has a smaller size, it is possible to easily mount in a vehicle. For this reason, it is preferable that the entire size of the steering angle sensor be further reduced. However, according to a steering angle sensor that measures the rotation angle of the steering wheel by using a gear train, since dependent gears mesh with the outer periphery of a rotary member that rotate together with a steering wheel and are rotated, the steering angle sensor should have a size suitable for receiving the dependent gears meshing with the rotary member. For this reason, the steering angle sensor has a limitation in reducing the entire size thereof.

SUMMARY OF THE INVENTION

Accordingly, embodiments of the present invention provide a steering angle sensor assembly for vehicle. According to the steering angle sensor assembly for a vehicle, dependent gears are provided to mesh with an inner periphery of a rotary member that rotates together with a steering wheel and to be rotated. A circuit board that detects the rotation of the dependent gears and generates electric signals is also provided on the side of the dependent gears provided on the inner periphery of the rotary member. Accordingly, the entire size of the steering angle sensor assembly can be reduced to be substantially the same size as the rotary member that rotates together with the steering wheel. As a result, it is possible to further reduce the entire size of the steering angle sensor assembly.

In addition, embodiments of the present invention further provide a steering angle sensor assembly that continuously applies force to gears meshing with each other to calculate a steering absolute angle. Therefore, it is possible to completely prevent backlash that is contact noise caused by assembly tolerance or the abrasion of teeth of the gears that mesh with each other to be rotated together with a steering wheel due to the rotation of the steering wheel.

According to an aspect of the present invention, a steering angle sensor assembly for a vehicle includes a rotary plate that is provided between a steering wheel and a steering column and rotated together with the steering wheel due to the rotation of the steering wheel. A planetary gear train is disposed on an inscribed surface of the rotary plate, is rotatably supported by supporting pins, and meshes with a sun gear formed on an inner periphery of the rotary plate. A circuit board is provided to correspond to the inscribed surface of the rotary plate and covers the planetary gear train while the supporting pins pass through the circuit board. The circuit board detects measurement signals used to calculate an absolute angle of the steering wheel on the basis of the intensity of a magnetic force corresponding to the rotation of the planetary gear train. The circuit board processes the measurement signals and transmits the processed measurement values to an ECU. A cover is provided on the side of the steering column, and the circuit board is fixed to the inner surface of the cover. The rotary plate is rotatably provided to the cover.

Further, in the assembly, the rotary plate may include a through hole formed at the center thereof so as to be fixed to a steering shaft received in a steering column. An inscribed surface may be formed between the through hole and the periphery on which the sun gear is formed, so as to receive the planetary gear train.

In the assembly, the planetary gear train may include first and second planetary gears that mesh with the sun gear formed on the periphery of the rotary plate to be spaced apart from each other and have different diameters. Further, the first and second planetary gears are rotatably supported by the supporting pins, the supporting pins pass through the first and second planetary gears and are inserted into through holes formed in the circuit board. The circuit board covers the first and second planetary gears, and the first and second planetary gears are rotated on the inscribed surface of the rotary plate.

Furthermore, in the assembly, the circuit board may include first and second detectors, which detect the movement of first and second magnets provided to the first and second planetary gears so as to generate signals and measures the number of rotations of first and second planetary gears by a magnetic force. The circuit board may include a connector connected with signal lines through which measurement values of the first and second detectors are transmitted to the ECU.

In this case, a position where the first and second detectors detect the maximum intensity of the magnetic force of the first and second planetary gears may be set to 0°, a position where the first and second detectors detect the minimum intensity of the magnetic force may be set to 180°, and a position where the first and second detectors detect the maximum intensity of the magnetic force may be set to 360°.

In addition, according to another aspect of the present invention, a steering angle sensor assembly for a vehicle includes a rotary plate that includes a sun gear formed on the outer periphery of an inner boss fixed to a steering wheel for rotating a steering shaft received in a steering column. The rotary plate is rotated together with the steering wheel due to the rotation of the steering wheel. A planetary gear train that is rotatably supported by supporting pins, meshes with a sun gear on an inscribed surface of the rotary plate disposed on the side of the steering wheel, and includes first and second planetary gears. The first and second planetary gears are provided with first and second magnets so as to detect the rotation of the first and second planetary gears caused by the sun gear. A clearance compensating member applies a force so that the teeth of the planetary gear train come in contact with the teeth of the sun gear. A circuit board is provided to correspond to the inscribed surface of the rotary plate and covers the planetary gear train while the supporting pins pass through the circuit board. The circuit board detects the movement of the first and second magnets of the planetary gear train by first and second detectors, processes measured values, and transmits the measured values to calculate steering angles of the steering wheel in an ECU. A cover is provided on the side of the steering column. The circuit board is movably provided on the inner surface of the cover and the rotary plate is rotatably provided in the cover.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Hereinafter, preferred embodiments of the present invention will be described in detail with reference to the accompanying drawings.

Figure 1:
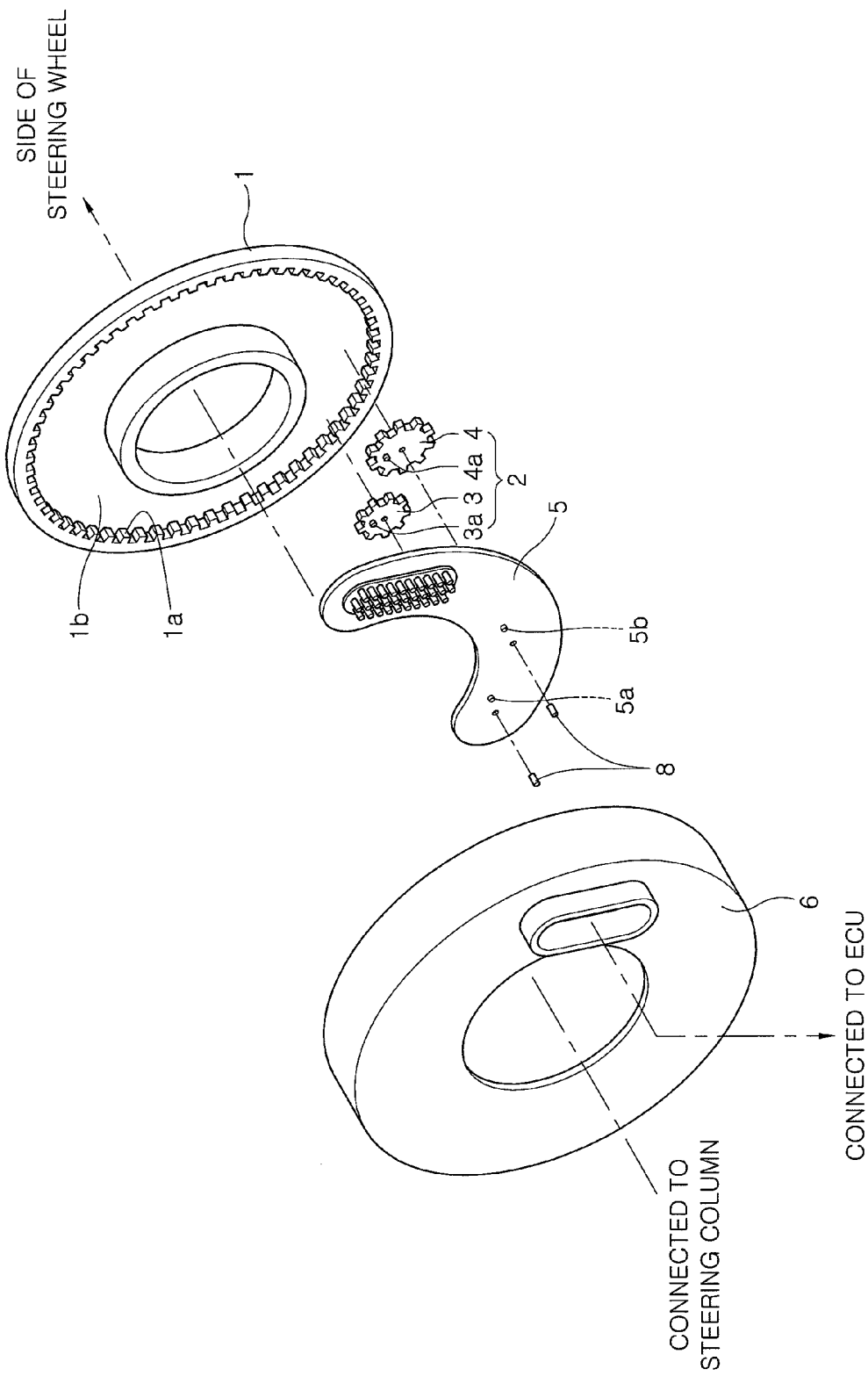
FIG. 1 is an exploded perspective view of a steering angle sensor assembly for a vehicle according to a first embodiment of the present invention.

FIG. 1 is an exploded perspective view of a steering angle sensor assembly for a vehicle according to a first embodiment of the present invention. A steering angle sensor assembly includes a rotary plate 1 that is provided between a steering wheel and a steering column and rotates together with the steering wheel by rotating the steering wheel, a planetary gear train 2 that is disposed on an inscribed surface 1b of rotary plate 1, is rotatably supported by supporting pins 8, and meshes with a sun gear 1a formed on an inner periphery of rotary plate 1, a circuit board 5 that is provided to correspond to inscribed surface 1b of rotary plate 1 and covers planetary gear train 2 while supporting pins 8 pass through circuit board 5, and a cover 6 that is provided on the side of the steering column and in which circuit board 5 is fixed to the inner surface thereof and rotary plate 1 is rotatably provided. The circuit board generates measurement signals used to calculate an absolute angle of the steering wheel on the basis of the intensity of a magnetic force corresponding the rotation of planetary gear train 2.

In this case, rotary plate 1 has a through hole at the center thereof, and is fixed to a steering shaft A received in the steering column so as to be rotated together with the steering wheel due to the rotation of the steering wheel. Further, inscribed surface 1b having a predetermined depth is formed between the through hole to which steering shaft A is fixed and the periphery on which sun gear 1a is formed, so as to receive planetary gear train 2.

Further, planetary gear train 2 includes first and second planetary gears 3 and 4. First and second planetary gears 3 and 4 are rotated by sun gear 1a formed on the inner periphery of rotary plate 1, which is rotated together with the steering wheel by rotating the steering wheel. First and second planetary gears 3 and 4 are provided with first and second magnets 3a and 4a, respectively.

Figure 2:
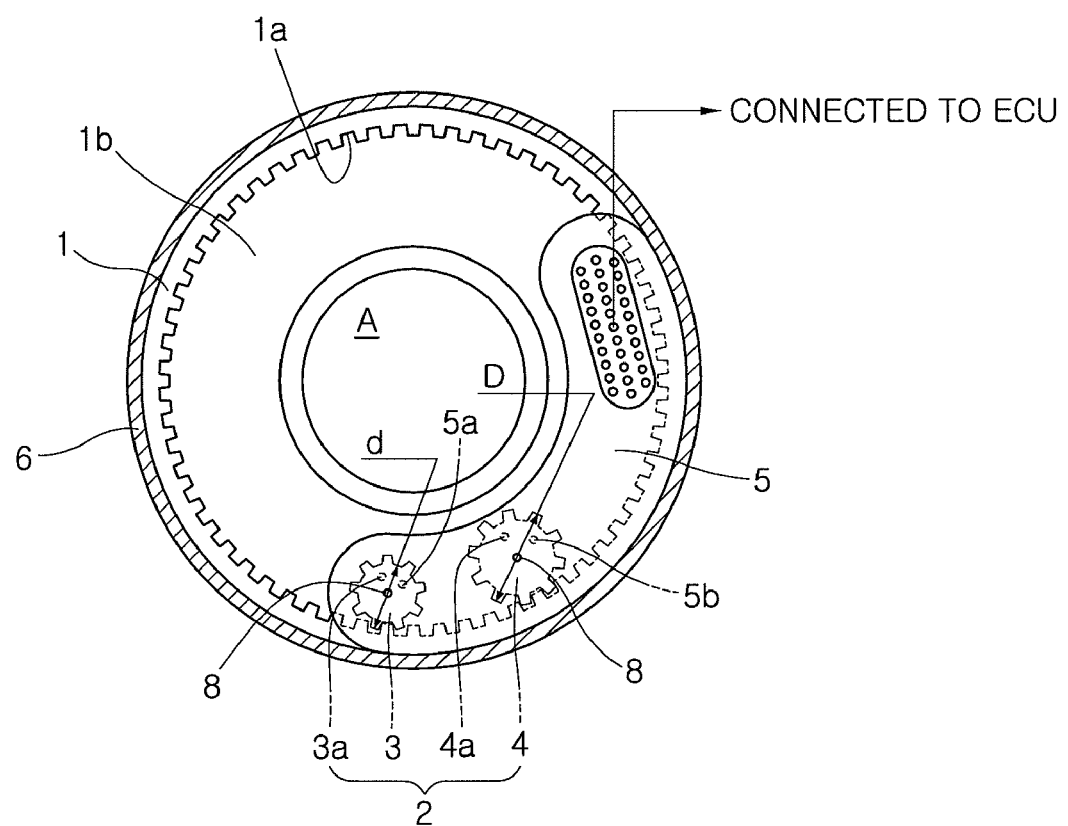
FIG. 2 is a cross-sectional view of the steering angle sensor assembly for a vehicle according to the first embodiment of the present invention.

In this case, as shown in FIG. 2, first and second planetary gears 3 and 4 are rotatably provided on inscribed surface 1b of rotary plate 1, and are spaced apart from each other. Further, first and second planetary gears 3 and 4 are rotatably supported by supporting pins 8, and supporting pins 8 are inserted into through holes formed in circuit board 5 that covers first and second planetary gears 3 and 4. Accordingly, first and second planetary gears 3 and 4 are rotated by sun gear 1a of rotary plate 1.

In this case, supporting pins 8 pass through circuit board 5 and are fitted to cover 6.

Further, since a diameter d of first planetary gear 3 is smaller than a diameter D of second planetary gear 4, the number of rotations of first and second planetary gears 3 and 4 are different from each other in respect to the rotation of sun gear 1a. The difference between diameters d and D of first and second planetary gears 3 and 4 in respect to the diameter of sun gear 1a, that is, the number of teeth of first and second planetary gears 3 and 4 in respect to the number of teeth of sun gear 1a is determined by the maximum number of rotations of the steering wheel.

For example, when the maximum number of rotations of the steering wheel is three, the number of rotations of sun gear 1a of rotary plate 1 that rotates together with the steering wheel due to the rotation of the steering wheel is different from the number of rotations of first and second planetary gears 3 and 4 meshing with sun gear 1a. An ECU calculates an absolute angle of the steering wheel by using signals corresponding to the difference in the number of rotations between first and second planetary gears 3 and 4 in respect to the rotation of sun gear 1a.

An algorithm of the ECU for calculating the absolute angle generally calculates the steering angle of the steering wheel by using the signals from a steering angle sensor. Further, since the difference between diameters d and D of first and second planetary gears 3 and 4 is determined by the diameter of sun gear 1a, the difference between diameters d and D is not limited to a specific numerical value and is omitted.

In addition, first and second detectors 5a and 5b are provided on circuit board 5. First and second detectors 5a and 5b detect the movement of first and second magnets 3a and 4a, which are provided to first and second planetary gears 3 and 4, to generate signals. Further, circuit board 5a is provided with a connector. The connector converts the signal generated from first and second detectors 5a and 5b into electric signals, and is connected to signal lines through which the electric signals are transmitted to the ECU.

In this case, first and second magnets 3a and 4a are provided to first and second planetary gears 3 and 4, respectively. Accordingly, as first and second planetary gears 3 and 4 are rotated, first and second magnets 3a and 4a approach or become distant from first and second detectors 5a and 5b, thereby changing the intensity of the magnetic force, which change the intensity of the magnetic force caused by first and second magnets 3a and 4a. First and second detectors 5a and 5b generate signals on the basis of the intensity of the magnetic force.

In this case, the connector is provided at an appropriate position on circuit board 5, and the position of the connector is appropriately changed in consideration of the structure of a portion of the steering device on which the steering angle sensor assembly is mounted, or the layout of a portion near the steering device. Accordingly, it is possible to further simplify the layout of the signal lines for connecting the connector with the ECU.

Further, supporting pins 8 are inserted into the through holes formed in circuit board 5 so that first and second magnets 3a and 4a are rotated.

In addition, circuit board 5 is formed in a shape that is completely received in rotary plate 1, corresponds to the inner periphery of rotary plate 1, and occupies inscribed surface 1b between the through hole formed at the center of the rotary plate and the inner periphery thereof. Further, circuit board 5 has a size occupying a portion of rotary plate 1.

Furthermore, cover 6 has a through hole through which the steering column or steering shaft is inserted. A connector positioner protrudes from the cover. The connector is connected to the connector positioner so that circuit board 5 is fixed regardless of the rotation of rotary plate 1 while rotary plate 1 is received in the cover.

In this case, a connector, which is provided on the signal lines connected to the ECU, is inserted into the connector positioner to be connected to the connector of circuit board 5.

In addition, through hole into which supporting pins 8 passing through the through holes of circuit board 5 are inserted are formed in cover 6. When supporting pins are inserted into only circuit board 5, the through hole may not be formed in cover 6.

Meanwhile, according to the steering angle sensor assembly of the present invention, it is possible to prevent the backlash caused by teeth of gears (the sun gear and planetary gear train) that mesh with each other to be rotated together with the steering wheel due to the rotation of the steering wheel. For example, the teeth of the gears (the sun gear and planetary gear train) meshing with each other come in close contact with each other.

Figure 3:
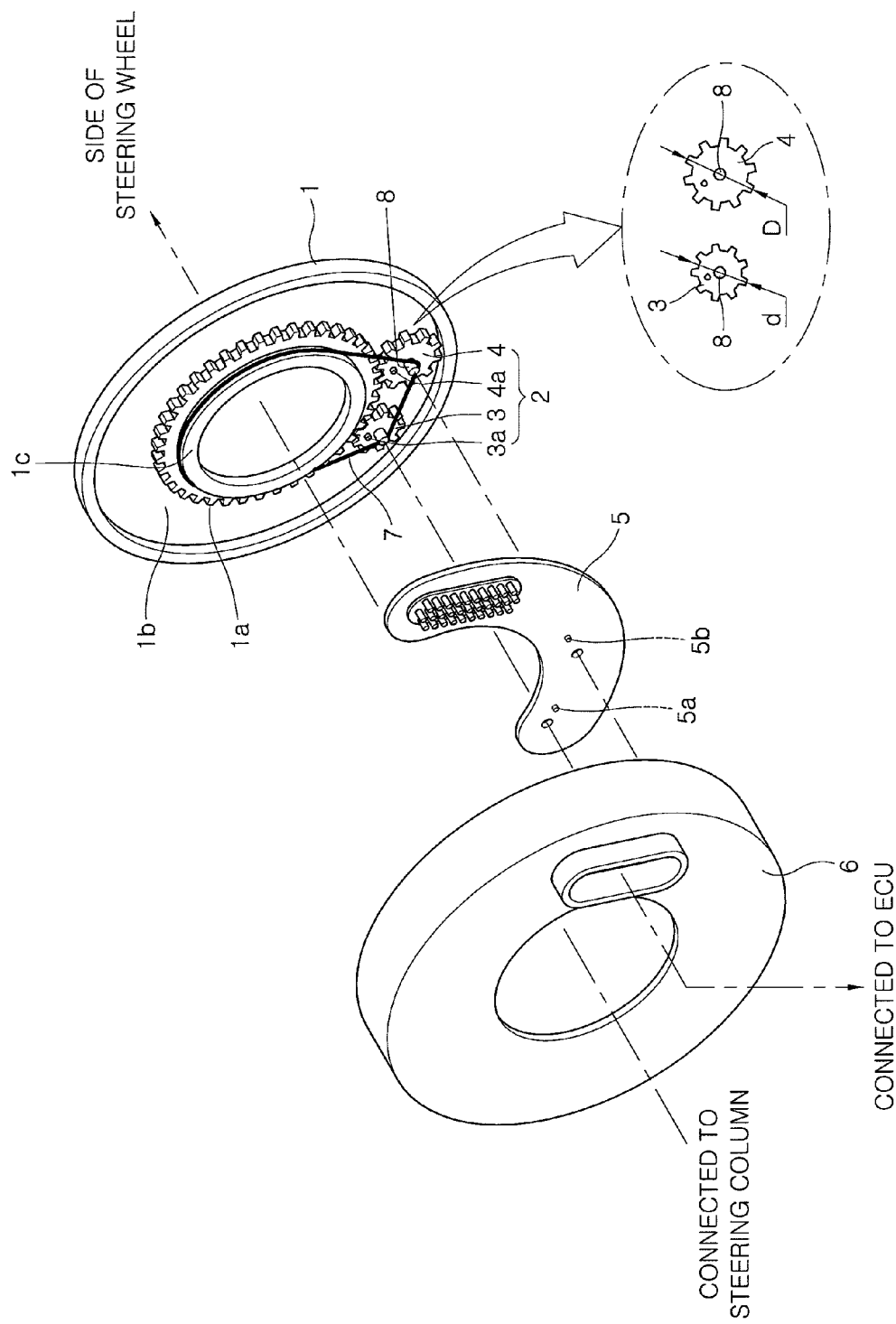
FIG. 3 is an exploded perspective view of a steering angle sensor assembly for a vehicle, which prevents backlash of a gear to be rotated, according to a second embodiment of the present invention.

That is, as shown in FIG. 3 that shows the second embodiment according to the present invention, the steering angle sensor assembly includes a rotary plate 1 that is provided between a steering wheel and a steering column and rotated together with the steering wheel due to the rotation of the steering wheel, a planetary gear train 2 that is rotatably supported by supporting pins 8 and meshes with a sun gear 1a formed on an outer periphery of an inner boss 1c on an inscribed surface 1b of rotary plate 1 disposed on the side of the steering wheel, a clearance compensating member 7 that press the teeth of planetary gear train 2 against the teeth of sun gear 1a, a circuit board 5 that is provided to correspond to inscribed surface 1b of rotary plate 1 and covers planetary gear train 2 while supporting pins 8 pass through circuit board 5, and a cover 6 that is provided on the side of the steering column and in which circuit board 5 is provided to the inner surface thereof so as to move to some extent and rotary plate 4 is rotatably provided. The circuit board detects measurement signals used to calculate an absolute angle of the steering wheel on the basis of the intensity of a magnetic force corresponding the rotation of the planetary gear train, processes the measurement signals, and transmits the processed measurement values to an ECU.

In this case, rotary plate 1 includes inner boss 1c at the center thereof and inscribed surface 1b. Inner boss 1c is fixed to a steering shaft A received in the steering column. Inscribed surface 1b has a predetermined depth so that sun gear 1a formed on the outer periphery of inner boss 1c and planetary gear train 2 are received between inner boss 1c and the inner periphery of rotary plate 1.

Further, planetary gear train 2 includes first and second planetary gears 3 and 4 that are rotated by sun gear 1a formed on the outer periphery of inner boss 1c of rotary plate 1. First and second planetary gears 3 and 4 are provided with first and second magnets 3a and 4a, respectively.

In this case, first and second planetary gears 3 and 4 are rotatably mounted on inscribed surface 1b of rotary plate 1, and are spaced apart from each other. Further, first and second planetary gears 3 and 4 are rotatably supported by supporting pins 8, and supporting pins 8 are inserted into through holes formed in circuit board 5 that covers first and second planetary gears 3 and 4. Accordingly, first and second planetary gears 3 and 4 are rotated by sun gear 1a of rotary plate 1.

Further, since a diameter d of first planetary gear 3 is smaller than a diameter D of second planetary gear 4, the number of rotations of first and second planetary gears 3 and 4 are different from each other in respect to the rotation of sun gear 1a. An absolute angle of the steering wheel is calculated by using the gears in the same method as the first embodiment.

In addition, clearance compensating member 7 for fixing first and second planetary gears 3 and 4 is made of an elastic material. Clearance compensating member 7 is wound around inner boss 1c that is formed at the center of rotary plate 1 and has sun gear 1a on the outer periphery thereof, and supporting pins 8 that support first and second planetary gears 3 and 4. The teeth of first and second planetary gears 3 and 4 are pressed against sun gear 1a due to the elastic force of clearance compensating member 7.

In this case, circuit board 5 and first and second planetary gears 3 and 4 move toward sun gear 1a due to a force that is applied to supporting pins 5 by clearance compensating member 7, so as to correspond to the degree of abrasion of the teeth of the gears. Since circuit board is provided to the inner surface of cover 6 so as to move to some extent, circuit board 5 can move as described above.

In this case, the elastic force of clearance compensating member 7 has a magnitude causing a frictional force that does not reduce the torque of first and second planetary gears 3 and 4. The above-mentioned magnitude of the elastic force is obtained by adjusting the state in which clearance compensating member 7 is wound around the sun gear and supporting pins 8 of first and second planetary gears 3 and 4.

Further, supporting pins 8 may be integrally formed with first and second planetary gears 3 and 4, or may be formed to be separated from first and second planetary gears 3 and 4 and be fixed to first and second planetary gears 3 and 4.

Hereinafter, the operation of the steering angle sensor assembly according to the present invention will be described in detail with reference to accompanying drawings.

The steering angle sensor assembly according to the present invention is provided between the steering wheel and the steering column, and calculates an absolute angle of the steering wheel from the electric signals corresponding to the rotation angle of the steering wheel during the rotation of the steering wheel, by using the algorithm of the ECU. In addition, the steering angle sensor assembly measures the steering angle. Further, since the electric signals caused by the rotation of the steering wheel are generated by using the inscribed gear train, it is possible to reduce the entire size of the steering angle sensor.

That is, as shown in FIG. 1 showing the first embodiment, the entire size of the steering angle sensor assembly of the present invention is determined by a diameter of cover 6 that is provided on the side of the steering column and receives rotary plate 1 rotated together with the steering wheel due to the rotation of the steering wheel.

Planetary gear train 2, which is received in cover 6 and is rotated by rotary plate 1 that rotates together with the steering wheel as shown in FIG. 2 to calculate an absolute angle of the steering wheel, is received in inscribed surface 1b to be inscribed on sun gear 1a that is formed on the inner periphery of rotary plate 1. Accordingly, a required space is not formed outside rotary plate 1 due to diameters d and D of first and second planetary gears 3 and 4 forming planetary gear train 2.

According to the steering angle sensor assembly of the present invention, planetary gear train 2 and circuit board 5 are provided between rotary plate 1 and cover 6 that are connected with each other. Further, signals generated from circuit board 5 are transmitted to the ECU through the signal lines connected to the connector positioner of cover 6, and the steering angle of the steering wheel is then calculated by using the algorithm of the ECU for calculating the absolute angle.

When rotary plate 1 is rotated together with the steering wheel due to the rotation of the steering wheel, first and second planetary gears 3 and 4 received in inscribed surface 1b of rotary plate 1 are inscribed on sun gear 1a of rotary plate 1 and are rotated. As first and second planetary gears 3 and 4 are rotated, the positions of first and second magnets 3a and 4a provided to first and second planetary gears 3 and 4 are changed.

The change of the positions of first and second magnets 3a and 4a caused by the rotation of first and second planetary gears 3 and 4 is detected by circuit board 5. As shown in FIG. 2, first and second detectors 5a and 5b provided to circuit board 5 covering first and second planetary gears 3 and 4 generate measurement signals corresponding to the change of the positions of first and second magnets 3a and 4a. Then, the signals generated from first and second detectors 5a and 5b are electrically processed by circuit board 5 including the elements, and transmitted to the signal lines connected to the connector.

In this case, first and second detectors 5a and 5b detect the number of rotations of first and second planetary gears 3 and 4, by using the intensity of the magnetic force that is changed on the basis of the change of distance between first and second magnets 3a and 4a and first and second detectors 5a and 5b. For example, a position corresponding to the maximum intensity of the magnetic force is set to 0°, a position corresponding to the minimum intensity of the magnetic force is set to 180°, and a position corresponding to the maximum intensity of the magnetic force is set to 360°. Then, the absolute angle of the steering wheel is calculated by the algorithm of the ECU.

That is, the signals of first and second detectors 5a and 5b, which detect the change of the intensity of the magnetic forces caused by first and second magnets 3a and 4a, are processed by a circuit including electric elements and are inputted to the ECU. Then, while calculating the number of rotations of first and second planetary gears 3 and 4 by algorithm, the ECU calculates the actual number of rotations of the steering wheel and steering angle in consideration of the ratio between the diameters of sun gear 1a and first and second planetary gears 3 and 4.

The ECU, which calculates the steering angle of the steering wheel by using information measured by the steering angle sensor assembly as described above, controls a vehicle by using the steering angle of the steering wheel.

Meanwhile, the operation of the second embodiment according to the present invention is the same as that of the first embodiment. In addition, according to the second embodiment, it is possible to prevent backlash occurring between sun gear 1a and first and second planetary gears 3 and 4 that mesh with each other. Accordingly, the only backlash preventing operation of the second embodiment will be described below.

That is, when the steering wheel is rotated, rotary plate 1 is rotated and first and second planetary gears 3 and 4 are also rotated by sun gear 1a, like in the first embodiment. First and second planetary gears 3 and 4 come in close contact with sun gear 1a due to the elastic force of clearance compensating member 7 that is wound around inner boss 1c of rotary plate 1 and supporting pins 8 for supporting first and second planetary gears 3 and 4.

The elastic force applied by clearance compensating member 7 continuously presses first and second planetary gears 3 and 4 against sun gear 1a. Accordingly, the elastic force prevents the occurrence of the gap caused by the abrasion of teeth or assembly tolerance between the gears that mesh each other and are rotated, that is, backlash that is contact noise between the teeth of sun gear 1a and first and second planetary gears 3 and 4.

When sun gear 1a and first and second planetary gears 3 and 4 do not come in close contact with each other, circuit board 5 and first and second planetary gears 3 and 4 move toward sun gear 1a in cover 6 due to a force that is applied to supporting pins 5 by clearance compensating member 7 so as to correspond to the degree of abrasion of the teeth of sun gear 1a and first and second planetary gears 3 and 4. As a result, first and second planetary gears 3 and 4 and circuit board 5 move toward sun gear 1a so that first and second planetary gears 3 and 4 and sun gear 1a come in close contact with each other.

Subsequently, the absolute angle of the steering wheel calculated by the ECU is processed in the same manner as the first embodiment. That is, the change of the intensity of the magnetic force, which is caused by the change of positions of first and second magnets 3a and 4a provided to first and second planetary gears 3 and 4, is detected by first and second detectors 5a and 5b of the circuit board. Then, circuit board 5 processes the signals of first and second detectors 5a and 5b by a circuit including electric elements, and transmits the signals to the ECU.

Then, while calculating the number of rotations of first and second planetary gears 3 and 4 by algorithm, the ECU calculates the actual number of rotations of the steering wheel and steering angle in consideration of the ratio between the diameters of sun gear 1a and first and second planetary gears 3 and 4. After that, the ECU controls a vehicle by using the steering angle of the steering wheel.

As described above, according to the present invention, a planetary gear train, which is rotated by the operation of a steering wheel and generates information used to calculate a steering absolute angle in an ECU, is inscribed on a gear formed on the periphery of a rotary member that is rotated by the operation of the steering wheel. Further, a circuit board for processing the measurement signals obtained from the planetary gear train is also provided in the rotary member, and the steering angle sensor can be formed to have a size of the only rotary member. Accordingly, it is possible to further reduce the entire size of the steering angle sensor assembly.

In addition, according to the present invention, the planetary gear train, which generates measurement values used to calculate a steering absolute angle, is inscribed on a gear formed on the inner periphery of a rotary member that is rotated together with the steering wheel. Accordingly, it is possible to minimize the effect of a backlash caused by gears provided outside.

Further, according to the present invention, since a force is continuously applied to gears that mesh with each other to calculate a steering absolute angle, it is possible to completely prevent backlash that is contact noise caused by gaps between the gears meshing with each other.

Furthermore, according to the present invention, it is possible to further reduce the entire size of the steering angle sensor. Accordingly, when the steering angle sensor assembly is mounted in a vehicle, it is possible to prevent the interference of other parts in the layout. As a result, it is possible to more easily mount the steering angle sensor assembly in a vehicle.

What is claimed is:

1. A steering angle sensor assembly for a vehicle, comprising:
   a rotary plate that is provided between a steering wheel and a steering column and rotated together with the steering wheel by rotating the steering wheel;
   a planetary gear train comprising a plurality of planetary gears disposed on an inscribed surface of the rotary plate, the planetary gears having diameters different from each other, the planetary gears being rotatably supported by supporting pins, and the planetary gears meshing with a sun gear formed on an inner periphery of the rotary plate;
   a circuit board that is provided to correspond to the inscribed surface of the rotary plate and covers the planetary gear train while the supporting pins pass through the circuit board, the circuit board detecting measurement signals used to calculate an absolute angle of the steering wheel on the basis of the intensity of a magnetic force corresponding to the rotation of the planetary gear train, processing the measurement signals, and transmitting the processed measurement values to an ECU; and
   a cover that is provided toward the steering column, the circuit board being fixed to an inner surface of the cover and the rotary plate being rotatably provided to the cover,
   wherein the rotary plate is formed as a first ring plate encompassing one side of the circuit board and the planetary gear train, the rotary plate, having at a center portion, an inner circular pipe portion that protrudes toward the cover,
   wherein the cover is formed as a second ring plate encompassing another side of the circuit board and a planetary gear train, the cover having at, a circumferential portion, an outer circular pipe portion that protrudes toward the rotary plate, and
   wherein the circuit board and the planetary gear train are positioned within an arc shaped space defined between the inner circular pipe portion and the outer circular pipe portion.

2. The assembly as defined in claim 1, wherein the rotary plate includes:
   a through hole formed at a center thereof so as to be fixed to a steering shaft received in a steering column; and
   an inscribed surface formed between the through hole and the periphery on which the sun gear is formed, so as to receive the planetary gear train.

3. The assembly as defined in claim 1, wherein the plurality of planetary gears includes first and second planetary gears that mesh with the sun gear formed on the periphery of the rotary plate to be spaced apart from each other.

4. The assembly as defined in claim 3, wherein the first and second planetary gears are rotatably supported by the supporting pins,
   the supporting pins pass through the first and second planetary gears and are inserted into circuit board through holes formed in the circuit board, which covers the first and second planetary gears, and the first and second planetary gears are rotated on the inscribed surface of the rotary plate.

5. The assembly as defined in claim 1, wherein the circuit board includes:
   first and second detectors, which detect movement of first and second magnets provided to first and second planetary gears, which comprise the plurality of planetary gears, so as to generate signals and measure number of rotations of first and second planetary gears by using a magnetic force; and
   a connector to be connected with signal lines through which measurement values of the first and second detectors are transmitted to the ECU.

6. The assembly as defined in claim 5, wherein the circuit board corresponds to the inner periphery of the rotary plate, and has a shape that covers the planetary gear train from above and a size that partially occupies the inscribed surface.

7. The assembly as defined in claim 5, wherein a position where the first and second detectors detect a maximum intensity of the magnetic force of the first and second planetary gears is set to 0, a position where the first and second detectors detect a minimum intensity of the magnetic force is set to 180, and then a position where the first and second detectors detect the maximum intensity of the magnetic force is set to 360.

8. The assembly as defined in claim 1, wherein the cover includes a through hole at a center thereof, and the circuit board is fixed to the inner surface of the cover.

9. The assembly as defined in claim 1, further comprising a clearance compensator that applies a force so that teeth of the planetary gear train contact with teeth of the sun gear.

10. The assembly as defined in claim 9, wherein the clearance compensator is made of an elastic material.

* * * * *